Patented Oct. 13, 1925.

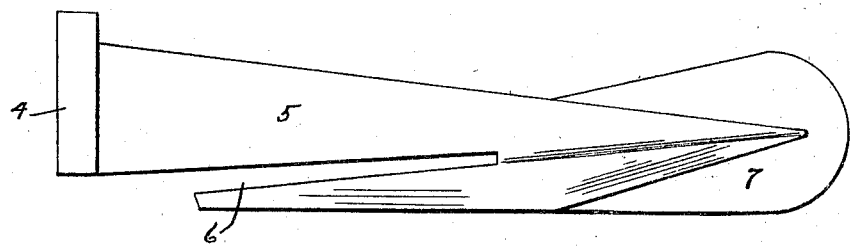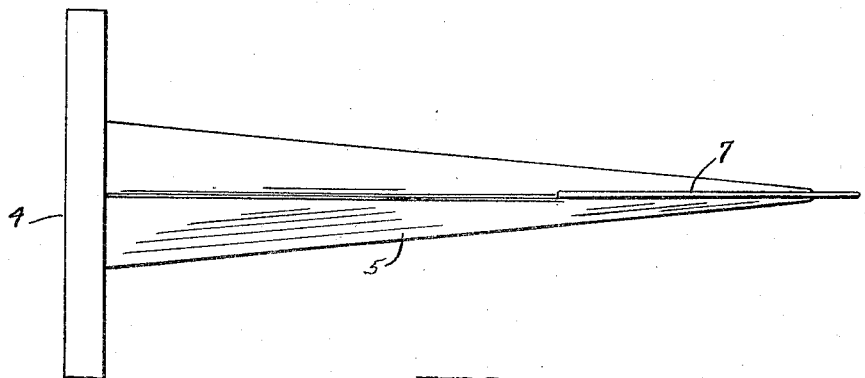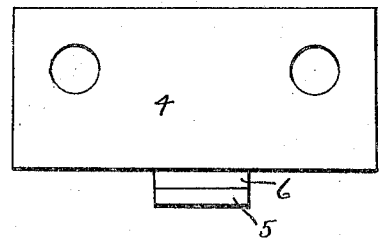

1,557,258

UNITED STATES PATENT OFFICE.

LOUIS A. LARSEN, OF HUBBARD PRECINCT, NEBRASKA.

SICKLE GUARD.

Application filed February 27, 1924. Serial No. 695,435.

*To all whom it may concern:*

Be it known that I, LOUIS A. LARSEN, a citizen of the United States and a resident of Hubbard Precinct, Dakota County, Nebraska, have invented certain new and useful Improvements in Sickle Guards, of which the following is a specification.

My present invention contemplates a sickle guard for mowing machines embodying improved means for preventing the point of the guard tooth from picking up stalks and other objects, and which in no way interferes with the proper operation of the mower.

With these objects in view, the invention, consisting in the construction, combination and novel arrangement of parts, will be fully understood from the following description, reference being had to the accompanying drawings, which form a part of this specification, and in which like characters of reference indicate corresponding parts throughout the several views, of which,—

Fig. 1 is a side elevation of my improved sickle tooth;

Fig. 2 is a plan thereof, and

Fig. 3 is a rear elevation of the same.

My sickle tooth consists of an upright supporting plate, 4, adapted to be secured to the sickle bar and formed integrally with a forwardly extending pointed guard, 5, the lower portion of which is provided with a horizontal slot, 6, in which the sickle-knives work.

The pointed end portion of the guard is formed integrally with a thin vertical fin, 7, which projects above, below and forwardly from the guard in the plane of the horizontal axis of the guard, having a substantially semi-circular forward edge. The lower edge of the fin is aligned with the under side of the body of the guard.

The diameter of the semi-circular portion of the forward end of the fin, 7, is preferably substantially equal to the height of the tooth, 5, from the ground at its base portion. The diameter may range somewhat smaller than this, but should not be less than the mean vertical diameter of the tooth, 5, in order that a sufficiently blunt, rounded forward edge may be presented to obstructions. It will be seen that the thin vertical fin will serve very efficiently to divide the stalks of grain or grass through which the mower tooth is being shoved because of its thinness. At the same time the broad curve of the forward edge of the tooth will prevent the tooth impaling any obstruction such as corn stalks, or the like, and in some cases will aid the tooth in sliding the obstructions laterally, while in other cases will serve to guide the tooth over the obstruction.

In the use of a mower or binder in grass or grain grown on ground previously used for corn, considerable inconvenience is caused by the fact that old corn stalks are pierced by the sickle guard points and then drag along with the machine. On stony ground the guard frequently strike small stones with bad results.

When my improved form of guard is used, no corn stalks will be picked up. The load is not increased by dragging such stalks, and the driver does not have to stop the machine to take off the stalks.

The shape of the fin, 7, is such as to cause the guards to readily ride over small sticks, stones and ridges. The lower edge of the fin and the bottom surface of the guard are aligned to enable the whole device to slide freely over ordinary obstructions. The shape and arrangement of the guard are such as to make it possible to cast the entire guard integrally at a low cost of manufacture. By extending the fin rearwardly a substantial distance from the point of the guard the fin is given proper strength and rigidity and will not readily be broken from the guard.

Having thus described my invention, what I claim as new and desire to secure by Letters Patent, is

A sickle guard embodying a supporting plate, a sickle tooth projecting forwardly therefrom and having a pointed end and a thin vertical fin formed integrally with the forward portion of the tooth, and projecting upwardly and downwardly from the pointed end of the tooth, the lower edge of the fin being substantially flush and aligned with the lower edge of the body of the tooth, and the forward edge of the fin being curved to substantially semi-circular shape, with a diameter greater than the mean vertical diameter of the tooth.

In testimony whereof, I have hereunto set my hand this 9th day of February, 1924.

LOUIS A. LARSEN.